United States Patent [19]
Iwata et al.

[11] Patent Number: 5,992,261
[45] Date of Patent: Nov. 30, 1999

[54] COLLAPSIBLE SHIFT LEVER HAVING A SHOCK ABSORBING SPRING

[75] Inventors: Hajime Iwata; Hitoshi Kanazawa, both of Aichi-ken, Japan

[73] Assignee: Kabushiki Kaisha Tokai-Rika-Denki-Seisakusho, Aichi-ken, Japan

[21] Appl. No.: 09/012,733

[22] Filed: Jan. 23, 1998

[51] Int. Cl.[6] .............................. G05G 1/04; B60K 20/00; F16F 7/12; F16M 13/00
[52] U.S. Cl. .................. 74/473.1; 74/473.33; 74/523; 188/371; 248/548
[58] Field of Search ...................... 188/371, 372, 188/315, 316, 317; 74/473.33, 473.31, 523, 333, 332; 248/548, 900

[56] References Cited

FOREIGN PATENT DOCUMENTS

| | | |
|---|---|---|
| 9-30281 | 2/1997 | Japan . |
| 9-30282 | 2/1997 | Japan . |
| 9-58288 | 3/1997 | Japan . |
| 9-58289 | 3/1997 | Japan . |

*Primary Examiner*—Tamara L. Graysay
*Assistant Examiner*—Colby Hansen
*Attorney, Agent, or Firm*—Sixbey Friedman Leedom & Ferguson; Thomas W. Cole

[57] ABSTRACT

In a shift lever to which operating force for changing a transmission by a driver is applied, a basal end thereof is inserted in a hole formed in a lever holder. Movement of the shift lever in the axial direction is prevented by an elastic member. When large force acts in the axial direction of the shift lever, the elastic member deflects and the shift lever moves in the axial direction, thereby allowing absorption of the load applied to the shift lever.

20 Claims, 10 Drawing Sheets

COLLAPSIBLE SHIFT LEVER HAVING A SHOCK ABSORBING SPRING

BACKGROUND OF THE INVENTION

1. Field of the Invention

The present invention relates to a shift lever device having a shock absorbing structure.

2. Description of the Related Art

As shown in FIG. 10, the bottom end of a shift lever 102 is mounted on a control shaft 104 and the control shaft 104 is supported axially by a shaft 108 of which both ends are supported by bearings 106. As a result, when a shift operation of the shift lever 102 is effected, the control shaft 104 rotates to allow selection of a desired shift range.

However, the shift lever 102 has high rigidity, and therefore, even if axial impact force (high load) acts on the shift lever 102 at the time of sudden deceleration of a vehicle (for example, at the time of collision), absorption or alleviation of the impact force could not be achieved.

SUMMARY OF THE INVENTION

In view of the above-described circumstances, it is an object of the present invention to provide a shift lever device which, when an axial impact force is applied to a shift lever, can absorb the impact force.

The present invention is a shift lever device for operating the transmission of a vehicle, the shift lever device comprising: a lever holder supported on a vehicle in a rotatable manner and transmitting a shift operation for the transmission; a shift lever inserted in an insertion hole formed in the lever holder and swinging the lever holder; and an elastic member which deforms due to a large axial force being applied to the shift lever to thereby allow the shift lever to move in the axial direction and absorb load applied to the shift lever.

Usually, the shift lever is supported by the elastic member in such a manner as to be inserted in the insertion hole of the lever holder, and can thereby select an arbitrary shift range by a shift operation.

When the shift lever is subjected to the axial impact force, the elastic member elastically deforms in such a manner as to be pressed by the shift lever. The elastic deformation of the elastic member allows absorption of the impact force applied to the shift lever.

DESCRIPTION OF THE PREFERRED EMBODIMENTS

Figure 1:
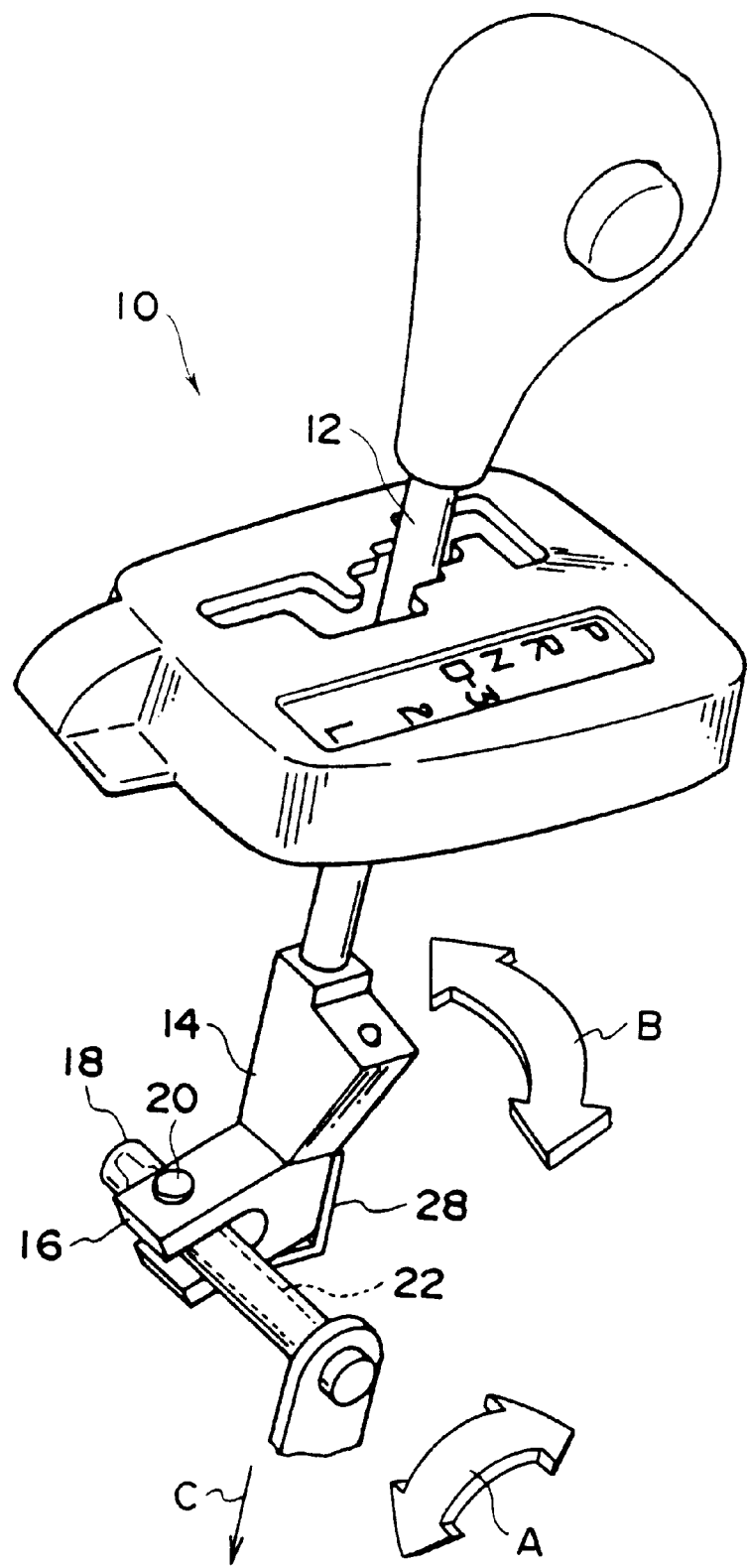
FIG. 1 is a schematic perspective view of a shift lever device according to a first embodiment of the present invention.
Figure 2:
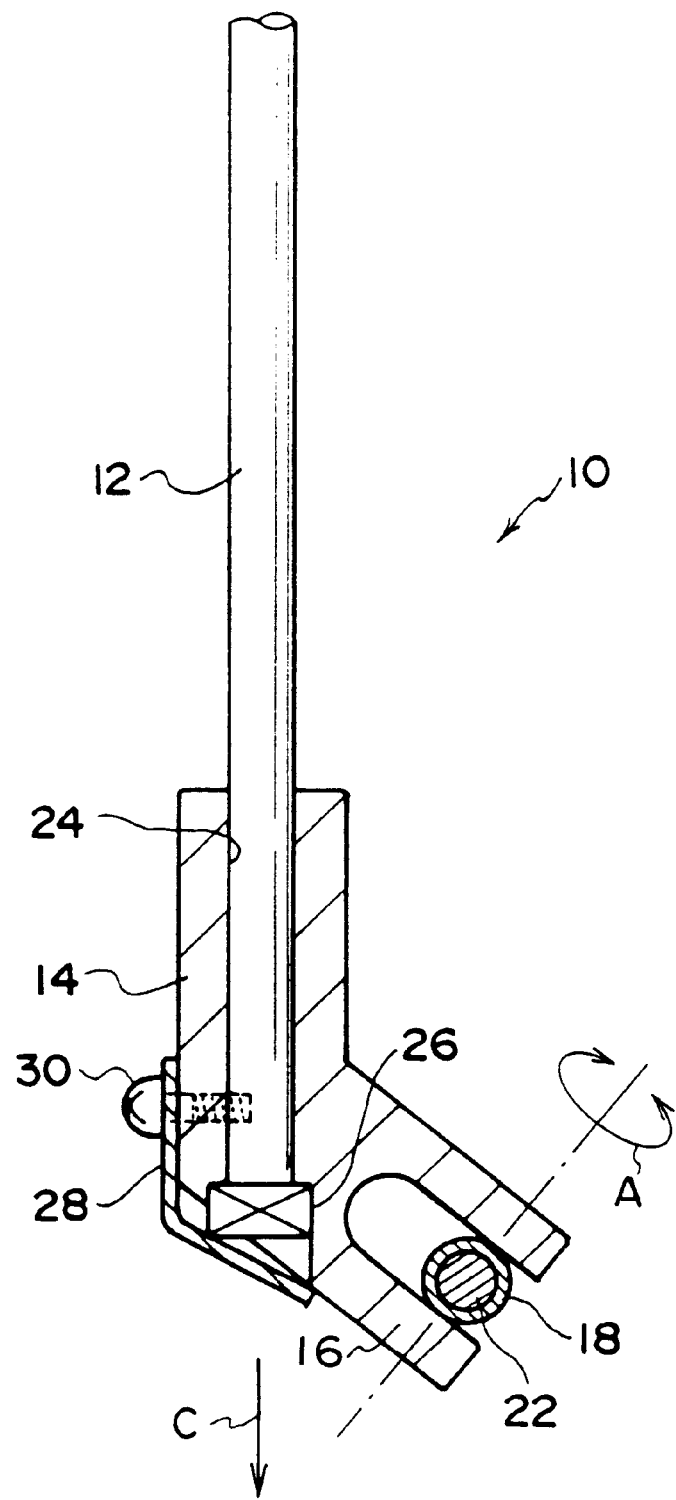
FIG. 2 is a cross-sectional view of the shift lever device according to the first embodiment of the present invention.

FIGS. 1 and 2 each show a shift lever device 10 according to a first embodiment of the present invention.

The shift lever device 10 has a shift lever 12 for a shift operation. The lower end of the shift lever 12 is mounted to a lever holder 14.

The lever holder 14 is bent obtusely substantially at an intermediate portion thereof and is thereby formed to have a substantially V-shaped configuration. Further, a bracket 16 is formed at the lower end of the lever holder 14 and a cylinder-shaped control shaft 18 is mounted inside the bracket 16. The bracket 16 is connected by a pin 20 to the control shaft 18, thereby allowing the lever holder 14 to swing around the axial line of the shaft 18 (i.e., in the directions indicated by double-headed arrow A in FIG. 1).

Further, the control shaft 18 is supported by a shaft 22. As a result, the shift lever 12 is provided to be swingable in a longitudinal direction of a vehicle (i.e., the directions indicated by double-headed arrow A in FIG. 1) with the shaft 22 serving as an axis and is also provided to be swingable in a transverse direction of the vehicle (i.e., the directions indicated by double-headed arrow B) with the pin 20 serving as an axis.

Further, a control lever (not shown) overhangs from the control shaft 18 and a pin of the control lever is connected to an automatic transmission via a transmission mechanism. Thus, the operation of the shift lever 12 allows shift of the automatic transmission.

An insertion hole 24 is formed to pass through the lever holder 14 from an upper end of the lever holder 14 to the lower side. The shift lever 12 is inserted in the insertion hole 24. A rectangular parallelepiped block 26 which is larger than the shaft diameter of the shift lever 12 is formed at the lower end of the shift lever 12. A portion near the lower end of the insertion hole 24 is increased in diameter and is formed rectangular parallelepiped so that the block 26 can be inserted with no clearance left between the hole 24 and the block 26. As a result, upward pull-out and rotation of the shift lever 12 is prevented.

Figure 3:
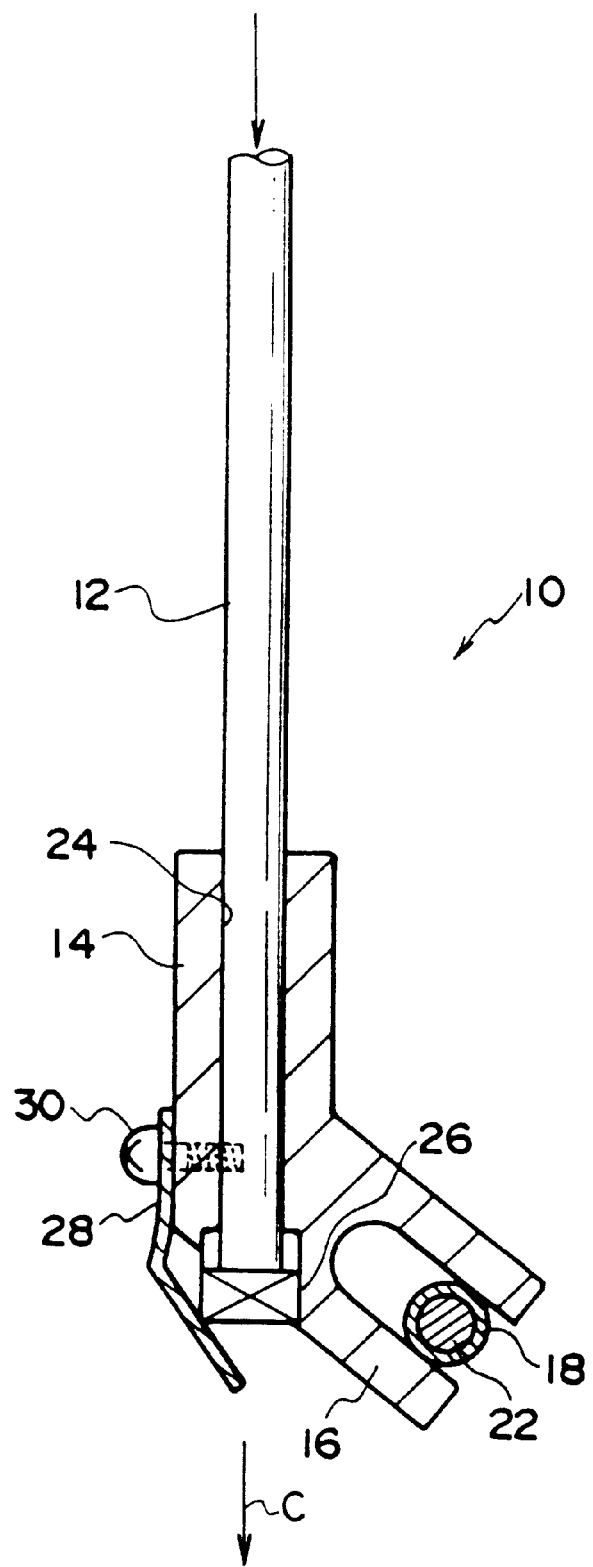
FIG. 3 is a cross-sectional view which illustrates a state in which impact force is applied to the shift lever device according to the first embodiment of the present invention.

A plate spring 28 is mounted to the lever holder 14 in such a manner as to be bent obtusely substantially at an intermediate portion thereof. The upper portion of the plate spring 28 is fixed to the lever holder 14 by a screw 30 and the lower portion of the plate spring 28 closes the insertion hole 24 from the lower side. For this reason, in an ordinary state, the block 26 of the shift lever 12 abuts against the plate spring 28 to prevent the shift lever 12 from coming out downward (i.e., in the direction indicated by arrow C). Further, when impact force acts in the axial direction of the shift lever 12, as shown in FIG. 3, the plate spring 28 deflects in such a manner as to be pushed by the block 26.

Figure 4:
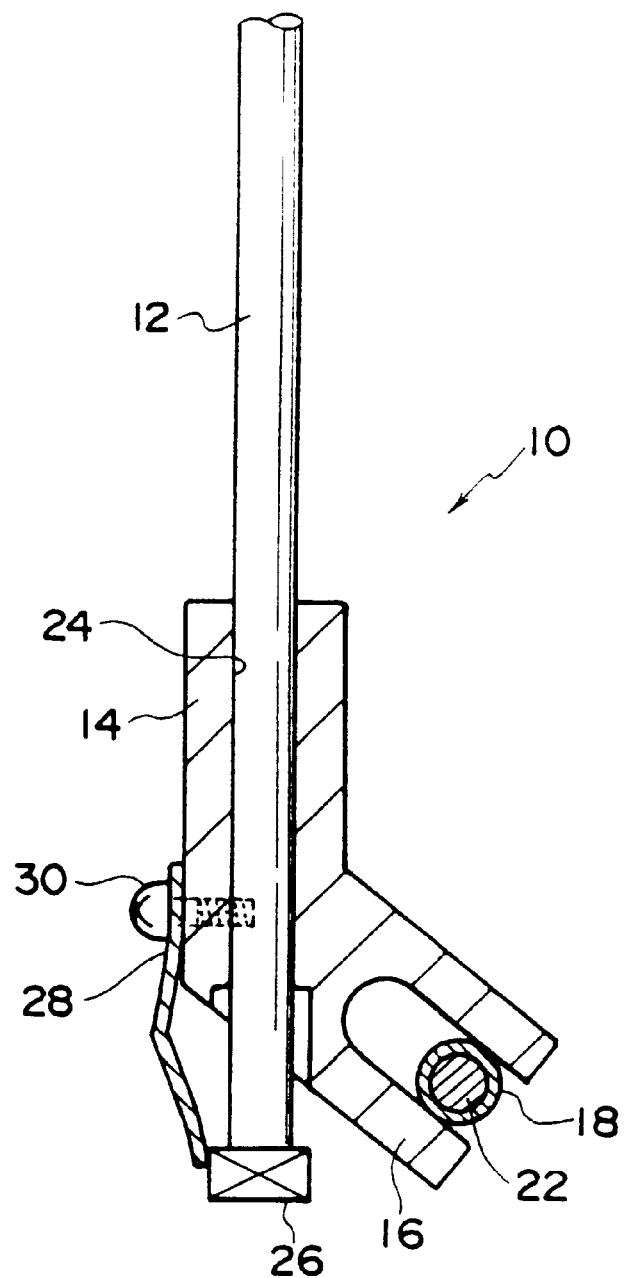
FIG. 4 is a cross-sectional view which illustrates a state in which impact force is applied to the shift lever device according to the first embodiment of the present invention.

When a greater impact force acts on the shift lever 12, as shown in FIG. 4, the plate spring 28 further deflects to be made almost straight and the shift lever 12 moves downward to come out of the hole.

Next, an operation of the shift lever device 10 according to the first embodiment will be described.

In an ordinary state, as shown in FIG. 2, the block 26 formed at the lower end of the shift lever 12 abuts against the plate spring 28 to prevent the shift lever 12 from coming out. Accordingly, when the shift lever 12 is operated to swing the lever holder 14, an arbitrary shift range can be selected.

When, at the time of sudden deceleration of a vehicle, or the like, a vehicle occupant or baggage hits against the upper end of the shift lever 12 so that axial impact force is applied to the shift lever 12, as shown in FIG. 3, the plate spring 28 is pressed by the block 26 and deflects elastically accordingly. The deflection of the plate spring 28 allows absorption of the impact force applied to the shift lever 12 and the shift lever 12 thereby moves downward.

Further, the lever holder 14 is bent substantially at the intermediate portion thereof and the axial line of the shift lever 12 is separated from the control shaft 18 and the shaft 22. For this reason, the impact force applied to the shift lever 12 is not transmitted to the control shaft 18 and the shaft 22.

When the impact force applied to the shift lever 12 exceeds a predetermined value, as shown in FIG. 4, the plate spring 28 pressed by the block 26 deflects completely to be made almost straight. As a result, the shift lever 12 comes out downward so that great impact force applied to the shift lever 12 is absorbed more effectively.

Further, the lever holder 14 is bent substantially at the intermediate portion thereof and the axial line of the shift lever 12 is separated from the control shaft 18 and the shaft 22. For this reason, even if the shift lever 12 falls out, the shift lever 12 does not hit against the control shaft 18 and the shaft 22 and the control shaft 18 and the shaft 22 are not broken.

Figure 5:
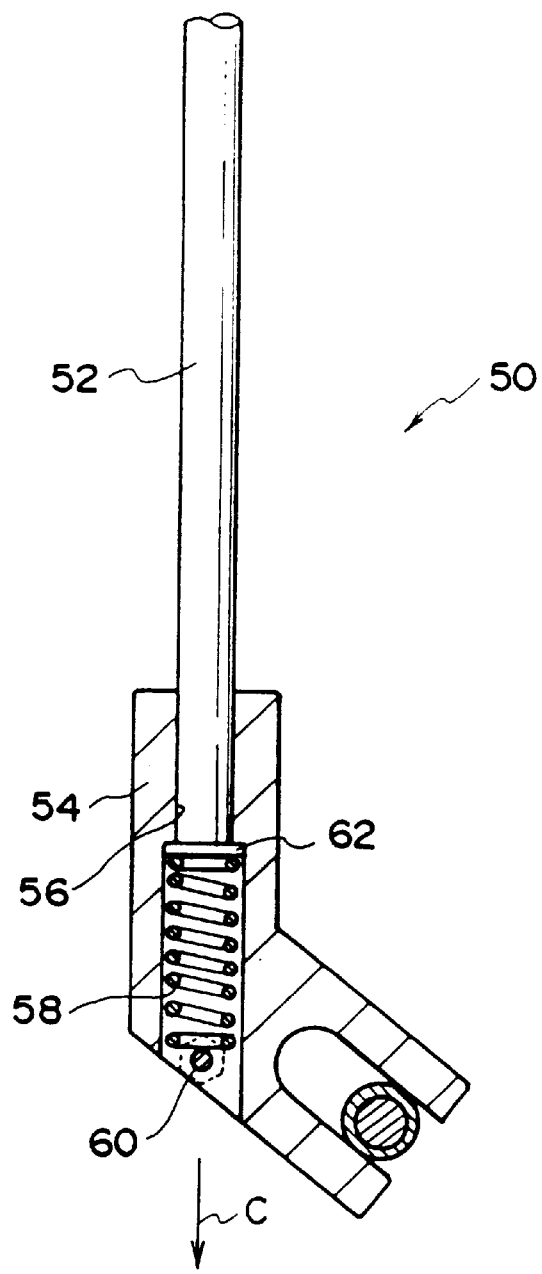
FIG. 5 is a cross-sectional view of a shift lever device according to a second embodiment of the present invention.

FIG. 5 shows a shift lever device 50 according to a second embodiment of the present invention.

Figure 7:
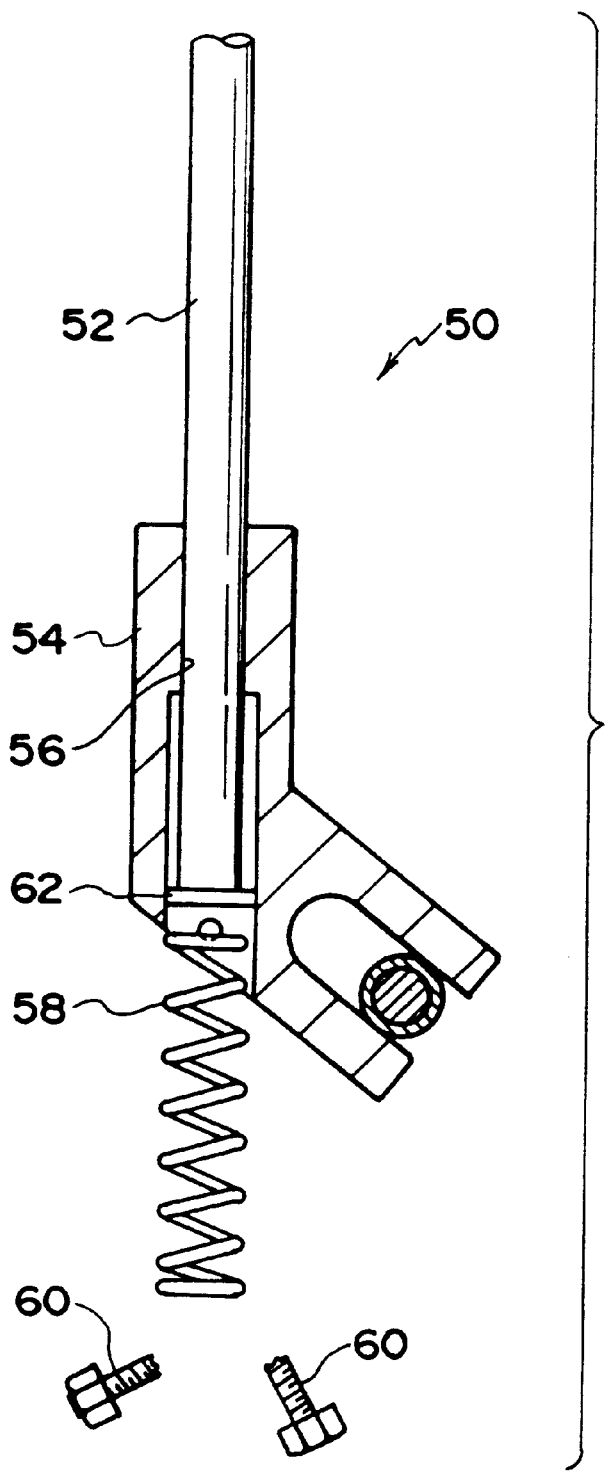
FIG. 7 is a cross-sectional view which illustrates a state in which impact force is applied to the shift lever device according to the second embodiment of the present invention.

In the shift lever device 50, a portion of an insertion hole 56 of the lever holder 54, which is located below the substantially intermediate portion of the insertion hole 56 in the longitudinal direction, is formed so that the diameter thereof is larger than the shaft diameter of a shift lever 52. Provided in the above diameter-enlarged portion of the hole 56 is a compression coil spring 58. The compression coil spring 58 is prevented from coming out by a pin 60 passing across the insertion hole 56 in the transverse direction. When load of a predetermined value or more is applied to the pin 60, the pin 60 is broken as shown in FIG. 7.

Further, the upper end of the compression coil spring 58 abuts against a block 62 formed at the lower end of the shift lever 52. The block 62 is formed to be larger than the shaft diameter of the shift lever 52 so as to prevent the shift lever 52 from being pulled out upward (i.e., in the direction opposite to that indicated by arrow C) and rotating.

In the shift lever device 50 as well, in the ordinary state, the block 62 of the shift lever 52 abuts against the compression coil spring 58 and is pushed upward, and therefore, the shift lever 52 is prevented from falling out downward. Accordingly, when the shift lever 52 is operated to swing the lever holder 54, an arbitrary shift range can be selected.

Figure 6:
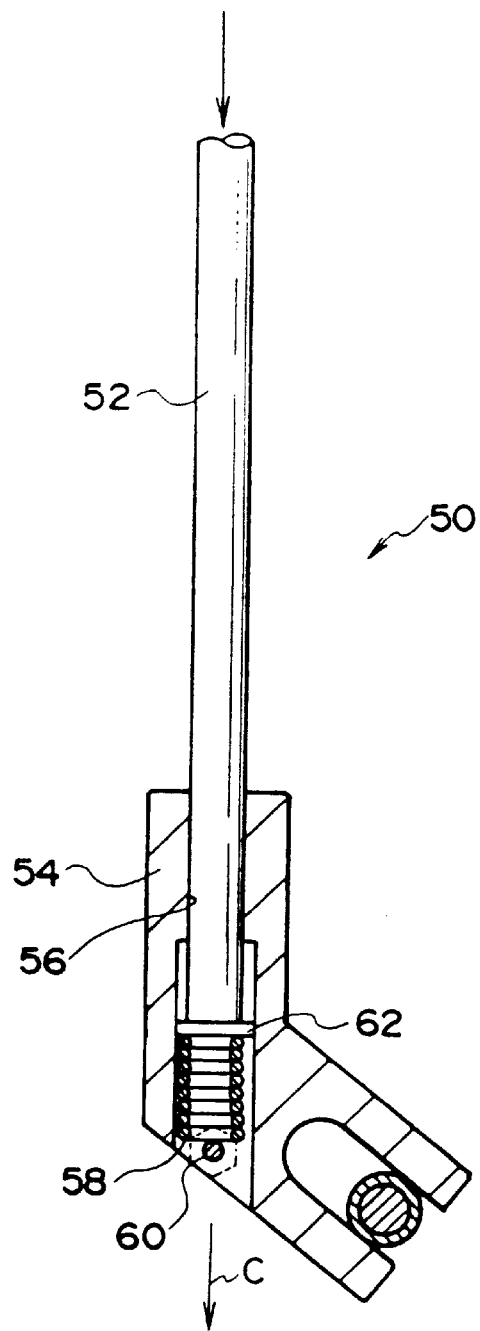
FIG. 6 is a cross-sectional view which illustrates a state in which impact force is applied to the shift lever device according to the second embodiment of the present invention.

When at the time of sudden deceleration of the vehicle, or the like, the axial impact force is applied to the shift lever 52, as shown in FIG. 6, the compression coil spring 58 is pressed and compressed by the block 62 and the impact force applied to the shift lever 52 is thereby absorbed.

When the axial impact force of the predetermined value or more is applied to the shift lever 52, as shown in FIG. 7, the pin 60 is pressed and broken by the compression coil spring 58. As a result, the shift lever 52 falls out downward and great impact force applied to the shift lever 52 is thereby absorbed more effectively.

Figure 8:
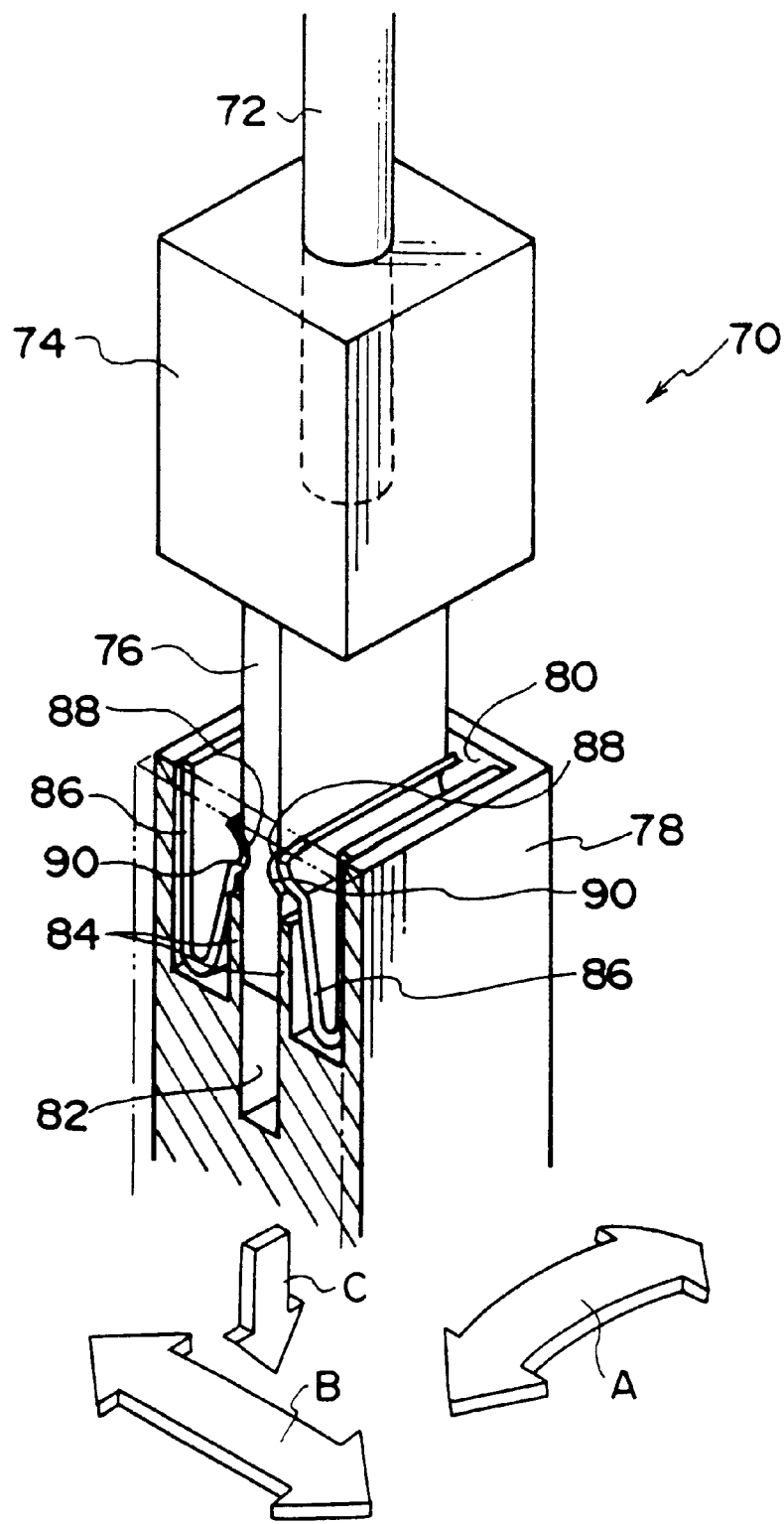
FIG. 8 is an enlarged perspective view of a shift lever device according to a third embodiment of the present invention with a portion partially broken away.

FIG. 8 shows a shift lever device 70 according to a third embodiment of the present invention.

In the shift lever device 70, a lower end of a shift lever 72 is mounted to a lever holder 74 rectangular parallelepiped in shape. The lever holder 74 has an insertion plate 76 which projects in a downward direction.

In this embodiment as well, a lever holder 78 similar to the lever holder 14 according to the first embodiment is provided which is swingable in the axial direction of the shaft 18 (see FIG. 1), i.e., the direction indicated by double-headed arrow B and is also swingable around the axial line of the shaft 18, i.e., in the directions indicated by double-headed arrow A. A concave portion 80 having a substantially quadrate cross-sectional configuration is formed at the upper end of the lever holder 78. Further, an insertion portion 82 is formed to extend downward at the center of the concave portion 80 and a pair of supporting plates 84 is formed upright from an edge portion of the insertion portion 82. The insertion plate 76 is inserted so that it can slide up and down between the supporting plates 84 and in the insertion portion 82.

A plate spring 86 folded acutely at a substantially intermediate portion thereof is provided respectively between an inner wall of the concave portion 80 and the insertion plate 76 and is also provided to catch and hold the insertion plate 76 from both sides. Further, an engaging portion 88 curved in the shape of a circular arc is formed in each plate spring 86 at the side of the insertion plate 76 in such a manner as to be engaged with each of the engaging recesses 90 formed in the insertion plate 76.

In the shift lever device 70 as well, in an ordinary state, the engaging portion 88 of the plate spring 86 is engaged with the engaging recess 90 of the insertion plate 76, and therefore, there is no possibility that the shift lever 72 inadvertently moves in the vertical direction. When the shift lever 72 is operated to swing the lever holder 78, an arbitrary shift range can be selected.

When, at the time of sudden deceleration of the vehicle, or the like, axial impact force is applied to the shift lever 72, first, with the engaging portions 88 engaged with the engaging recesses 90, the insertion plate 76 moves toward the insertion portion 82 while causing the plate springs 86 to deflect. The deflection of the plate springs 86 allows absorption of the impact force applied to the shift lever 72.

Figure 9:
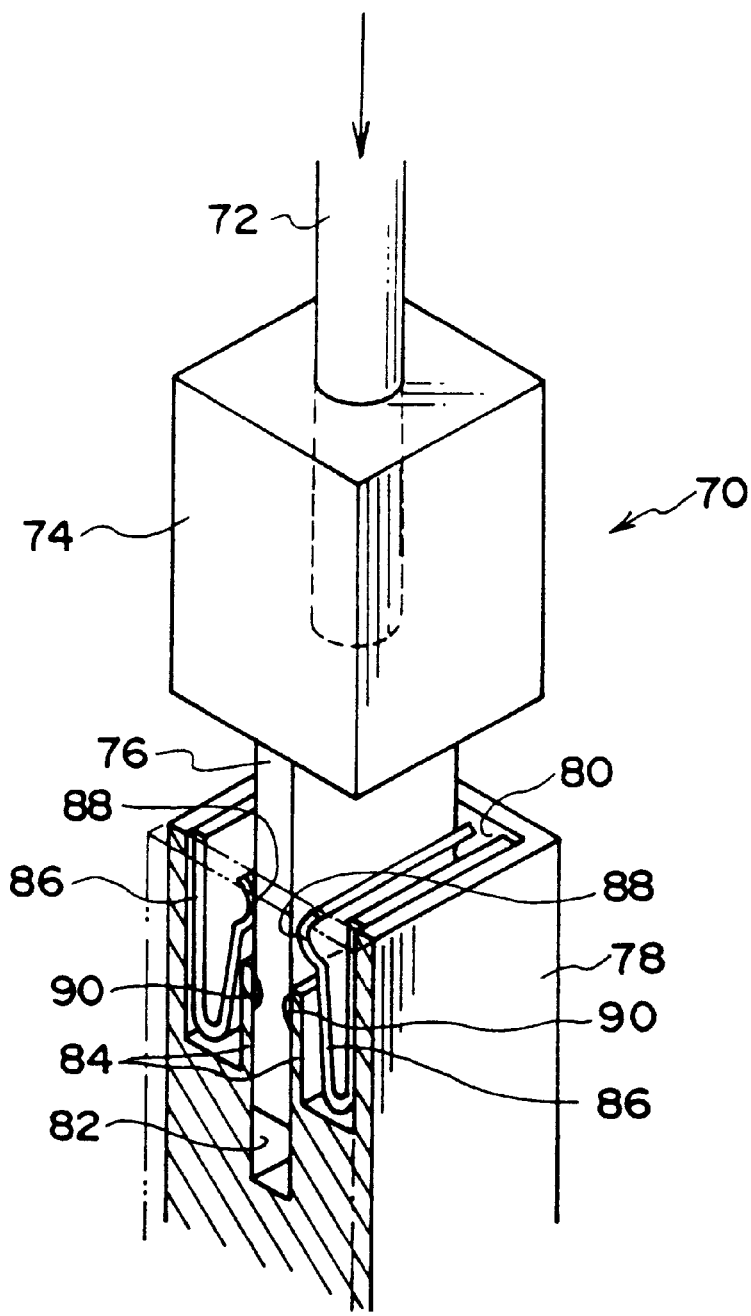
FIG. 9 is an enlarged perspective view which illustrates a state in which impact force is applied to the shift lever device according to the third embodiment of the present invention.
Figure 10:
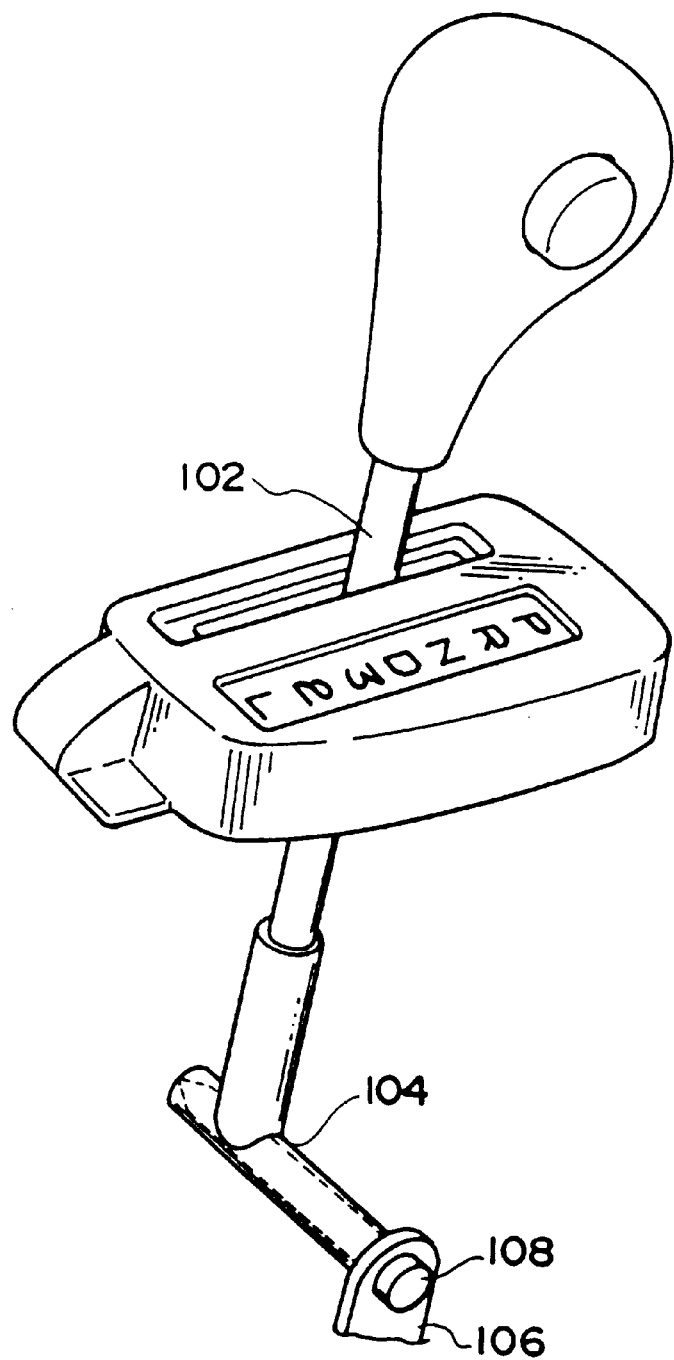
FIG. 10 is a schematic perspective view of a conventional shift lever device.

When the axial impact force of the predetermined value or more is applied to the shift lever 72, as shown in FIG. 9, the engaging portions 88 are separated from the engaging concave recesses 90, respectively. As a result, the insertion plate 76 is inserted so that it can slide in the insertion portion 82. However, the engaging portions 88 catch the insertion plate 76 by elastic force of the plate springs 86, and therefore, friction is generated respectively between the insertion plate 76 and the engaging portions 88, which forms resistance to sliding. For this reason, great impact force applied to the shift lever 72 can be absorbed.

Meanwhile, in the shift lever device 70 described above, the insertion plate 76 may be formed directly on the shift lever 72.

What is claimed is:

1. A shift lever device for operating a transmission of a vehicle, comprising:
   (a) a lever holder supported rotatably on a vehicle and transmitting shift operation to a transmission;
   (b) a shift lever inserted in an insertion hole formed in said lever holder, said shift lever rotating said lever holder; and
   (c) a spring member which deforms due to a large axial force acting on the shift lever to allow said shift lever to move in the axial direction and thus absorb a load applied to said shift lever.

2. A shift lever device according to claim 1, wherein when the load applied to said shift lever is small, said spring member returns to its original state after elastic deformation, thereby returning said shift lever to its original position, and wherein when the load applied to said shift lever is large said spring member elastically resists axial movement of said lever a stroke distance.

3. A shift lever device according to claim 1, wherein said spring member is a plate spring.

4. A shift lever device according to claim 3, wherein the plate spring is disposed on a moving locus along the axial direction of said shift lever and a portion of the plate spring is supported on said lever holder.

5. A shift lever device according to claim 1, wherein an extended line of an axis of said shift lever is separated from the rotational center of a shift operation of said lever holder so that a large moving stroke in the axial direction of said shift lever is ensured.

6. A shift lever device according to claim 1, wherein when the load applied to said shift lever is above a predetermined amount, a deformable member is provided which ensures support of said spring member and which allows large axial movement of said shift lever.

7. A shift lever device according to claim 1, wherein said elastic member is a compression coil spring which is disposed along the axial direction of said shift lever.

8. A shift lever device according to claim 7, wherein one end of the compression coil spring abuts against said shift lever and the other end of the compression coil spring is supported on a pull-out preventing member.

9. A shift lever device according to claim 8, wherein the pull-out preventing member is a deformable member which cancels support of the elastic member due to load of at least a predetermined value acting thereon so as to allow a large axial movement of said shift lever.

10. A shift lever device according to claim 9, wherein said deformable member is a pin which is provided to be broken due to a load of at least a predetermined value acting thereon.

11. A shift lever device according to claim 1, wherein said spring member is formed by a pair of elastic bodies which abut against said shift lever from opposite sides with an axial center of said shift lever disposed therebetween to stop movement of said shift lever.

12. A shift lever device according to claim 11, wherein said shift lever includes a recess in which a portion of said spring member is received.

13. A shift lever device according to claim 1, wherein said lever holder includes a through hole formed therein, the through hole being provided to allow the shift lever to pass therethrough.

14. A shift lever device according to claim 13, wherein said spring member is an elastic body which is disposed at a lower end portion of the through hole to close the through hole.

15. A shift lever device comprising:
   (a) a lever holder which rotates pivotally in a transverse direction of a vehicle and is movable in a longitudinal direction of the vehicle;
   (b) a shift lever for operating a transmission by a driver, a basal end of the shift lever being inserted in a hole formed in said lever holder and the other end of the shift lever projecting into the interior of the vehicle; and
   (c) a spring member supported on said lever holder and abutting against the basal end of said shift lever to prevent movement of said shift lever in the axial direction, whereby when axial load applied to said shift lever is small, said spring member returns said shift lever to its original position after slight movement of said shift lever in the axial direction, and when axial load applied to said shift lever is large, said spring member allows a large movement of said shift lever in the axial direction without returning said shift lever to its original position and decreases an amount by which said shift lever projects into the interior of the vehicle to absorb the load applied to said shift lever.

16. A shift lever device according to claim 15, wherein said spring member is a plate spring with one end fixed to said lever holder and the other end abuts against said shift lever.

17. A shift lever device according to claim 16, wherein said spring member is a compression coil spring inserted in the hole in such a manner as to be coaxial with said shift lever.

18. A shift lever device according to claim 17, wherein said spring member is provided in such a manner that one end thereof abuts against said shift lever and the other end abuts against a shear pin, the shear pin being broken by a large load applied to said shift lever to allow movement of said shift lever in the axial direction.

19. A shift lever device comprising:
   (a) a lever holder which swings pivotally in a transverse direction of a vehicle and is movable in a longitudinal direction of the vehicle;
   (b) a shift lever for operating a transmission by a driver, a basal end of the shift lever being inserted in a hole formed in said lever holder and other end of the shift lever projecting into the interior of the vehicle; and
   (c) a spring member supported on said lever holder and abutting against an intermediate portion of said shift lever in the axial direction to prevent movement of said shift lever in the axial direction, whereby when the axial load applied to said shift lever is small, said spring member returns said shift lever to its original position after slight movement of said shift lever in the axial direction, and when axial load applied to said shift lever is large, said spring member allows a large movement of said shift lever in the axial direction without returning said shift lever to its original position and decreases the amount by which said shift lever projects into the interior of the vehicle to absorb the load applied to said shift lever.

20. A shift lever device according to claim 19, wherein a recess is formed at an intermediate portion of said shift lever in the axial direction in such a manner that both ends thereof in the axial direction of said shift lever are each made shallow, and the end of said spring member is inserted in the recess.

* * * * *